US006345503B1

(12) United States Patent
Gladden

(10) Patent No.: US 6,345,503 B1

(45) Date of Patent: Feb. 12, 2002

(54) MULTI-STAGE COMPRESSOR IN A TURBOCHARGER AND METHOD OF CONFIGURING SAME

(75) Inventor: John R. Gladden, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/666,633

(22) Filed: Sep. 21, 2000

(51) Int. Cl.[7] .................................................. F02B 33/44

(52) U.S. Cl. ........................ 60/612; 60/605.1; 417/407; 417/409; 415/199.1; 415/199.2; 415/198 A; 415/120; 415/210

(58) Field of Search ................................ 60/612, 605.1; 417/407, 409; 415/199.1, 199.2, 199.3, 120, 210; 416/198 A

(56) References Cited

U.S. PATENT DOCUMENTS 1,213,889 A * 1/1917 Lawaczeck .............. 415/199.3
2,189,106 A * 2/1940 Garve et al. .................. 60/612
2,216,074 A * 9/1940 Garve et al. .................. 60/612
2,985,108 A * 5/1961 Stoner et al. ............... 415/120
3,941,506 A * 3/1976 Robb et al. ............. 416/198 A
4,082,477 A * 4/1978 Kronogard ............... 415/199.1
4,344,289 A 8/1982 Curiel et al. .................. 60/612
4,645,419 A * 2/1987 Furuya et al. .............. 415/210
4,705,463 A * 11/1987 Joco ........................... 417/407

* cited by examiner

*Primary Examiner*—Thomas Denion
*Assistant Examiner*—Thai Ba Trieu
(74) *Attorney, Agent, or Firm*—Todd T. Taylor

(57) ABSTRACT

A method of configuring a compressor in a turbocharger for use in an internal combustion engine is provided with the steps of: providing a multi-stage compressor including a first compressor wheel carried by a shaft, an axially extending first inlet and a radially extending first outlet associated with the first compressor wheel, a second compressor wheel carried by the shaft, an axially extending second inlet and a radially extending second outlet associated with the second compressor wheel; fluidly interconnecting in series the first outlet with the second inlet using an interstage duct; selecting a total pressure ratio to be provided by the multi-stage compressor; ascertaining a first pressure ratio provided by the first compressor wheel at an operating speed; sizing the second compressor wheel to provide a second pressure ratio, dependent upon the total pressure ratio and the first pressure ratio; determining a stress on the second compressor wheel at the operating speed; determining a temperature within the interstage duct at the operating speed; and selecting a material from which the second compressor wheel is constructed, dependent upon each of the stress determining step and the temperature determining step.

15 Claims, 2 Drawing Sheets

10 22b 22a 42 50 44 48 32 46 38 36 16 30 20 A B 40 18 24 26 28 12 34 14

STRESS
TEMPERATURE 10
22b
22a
42
50
44
48
32
46
38
36
30
16
20
A
B
40
18
24
26
12
28
34
14

MULTI-STAGE COMPRESSOR IN A TURBOCHARGER AND METHOD OF CONFIGURING SAME

TECHNICAL FIELD

The present invention relates to a turbocharger for use in an internal combustion engine, and, more particularly, to a turbocharger having a multi-stage compressor.

BACKGROUND ART

An internal combustion engine may include one or more turbochargers for compressing a fluid which is supplied to one or more combustion chambers within corresponding combustion cylinders. Each turbocharger typically includes a turbine driven by exhaust gases of the engine and a compressor which is driven by the turbine. The compressor receives the fluid to be compressed and supplies the fluid to the combustion chambers. The fluid which is compressed by the compressor may be in the form of combustion air or a fuel and air mixture.

A turbocharger may also include a two stage compressor with two separate compressor wheels which are carried and driven by a common shaft. U.S. Pat. No. 4,344,289 (Curiel et al.) discloses a supercharger with a two-stage compressor having two compressor wheels which are disposed in a back-to-back orientation relative to each other and carried by a common shaft. The hub portions of the two compressor wheels are configured differently relative to each other, but the overall diameter of the compressor wheels at the outside diameter of the blades is the same. The two compressor wheels and the common shaft appear to be monolithically formed with each other. Since the compressor wheels have the same diameter, the stress capacity of the compressor wheels is limited by the common material from which they are constructed. Moreover, the rotational inertia of the entire compressor assembly can only be altered by changing the geometry of the compressor wheels since they are constructed from a common material.

The present invention is directed to overcoming one or more of the problems as set forth above.

DISCLOSURE OF THE INVENTION

In one aspect of the invention, a method of configuring a compressor in a turbocharger for use in an internal combustion engine is provided with the steps of: providing a multi-stage compressor including a first compressor wheel carried by a shaft, an axially extending first inlet associated with the first compressor wheel, a radially extending first outlet associated with the first compressor wheel, a second compressor wheel carried by the shaft, an axially extending second inlet associated with the second compressor wheel, and a radially extending second outlet associated with the second compressor wheel; fluidly interconnecting in series the first outlet associated with the first compressor wheel with the second inlet associated with the second compressor wheel using an interstage duct; selecting a total pressure ratio to be provided by the multi-stage compressor; ascertaining a first pressure ratio provided by the first compressor wheel at an operating speed; sizing the second compressor wheel to provide a second pressure ratio, dependent upon the total pressure ratio and the first pressure ratio; determining a stress on the second compressor wheel at the operating speed; determining a temperature within the interstage duct at the operating speed; and selecting a material from which the second compressor wheel is constructed, dependent upon each of the stress determining step and the temperature determining step.

In another aspect of the invention, a method of operating an internal combustion engine is provided with the steps of: providing an exhaust manifold; providing a multi-stage compressor including a turbine carried by a shaft, a turbine inlet fluidly connected with the exhaust manifold, a first compressor wheel carried by the shaft, an axially extending first inlet associated with the first compressor wheel, a radially extending first outlet associated with the first compressor wheel, a second compressor wheel carried by the shaft, an axially extending second inlet associated with the second compressor wheel, and a radially extending second outlet associated with the second compressor wheel; fluidly interconnecting in series the first outlet associated with the first compressor wheel with the second inlet associated with the second compressor wheel using an interstage duct; selecting a total pressure ratio to be provided by the multi-stage compressor; ascertaining a first pressure ratio provided by the first compressor wheel at an operating speed; sizing the second compressor wheel to provide a second pressure ratio, dependent upon the total pressure ratio and the first pressure ratio; determining a stress on the second compressor wheel at the operating speed; determining a temperature within the interstage duct at the operating speed; selecting a material from which the second compressor wheel is constructed, dependent upon each of the stress determining step and the temperature determining step; and rotatably driving the turbine, the first compressor wheel and the second compressor wheel using exhaust gas from the exhaust manifold.

In a further aspect of the invention, a turbocharger for an internal combustion engine is provided with a multi-stage compressor providing a total pressure ratio of between 3.5:1 and 9:1. The multi-stage compressor includes a shaft; a first compressor stage including a first compressor wheel carried by the shaft, an axially extending first inlet associated with the first compressor wheel, and a radially extending first outlet associated with the first compressor wheel. The first compressor wheel has a first diameter (A) and is constructed of aluminum. A second compressor stage includes a second compressor wheel carried by the shaft, an axially extending second inlet associated with the second compressor wheel, and a radially extending second outlet associated with the second compressor wheel. The second compressor wheel has a second diameter (B) and is constructed of titanium or steel. The first compressor wheel and the second compressor wheel have a ratio (A:B) of between 1.15:1 and 2.5:1, preferably between 1.25:1 and 1.6:1. An interstage duct fluidly interconnects in series the first outlet associated with the first compressor wheel with the second inlet associated with the second compressor wheel.

BEST MODE FOR CARRYING OUT THE INVENTION

Figure 1:
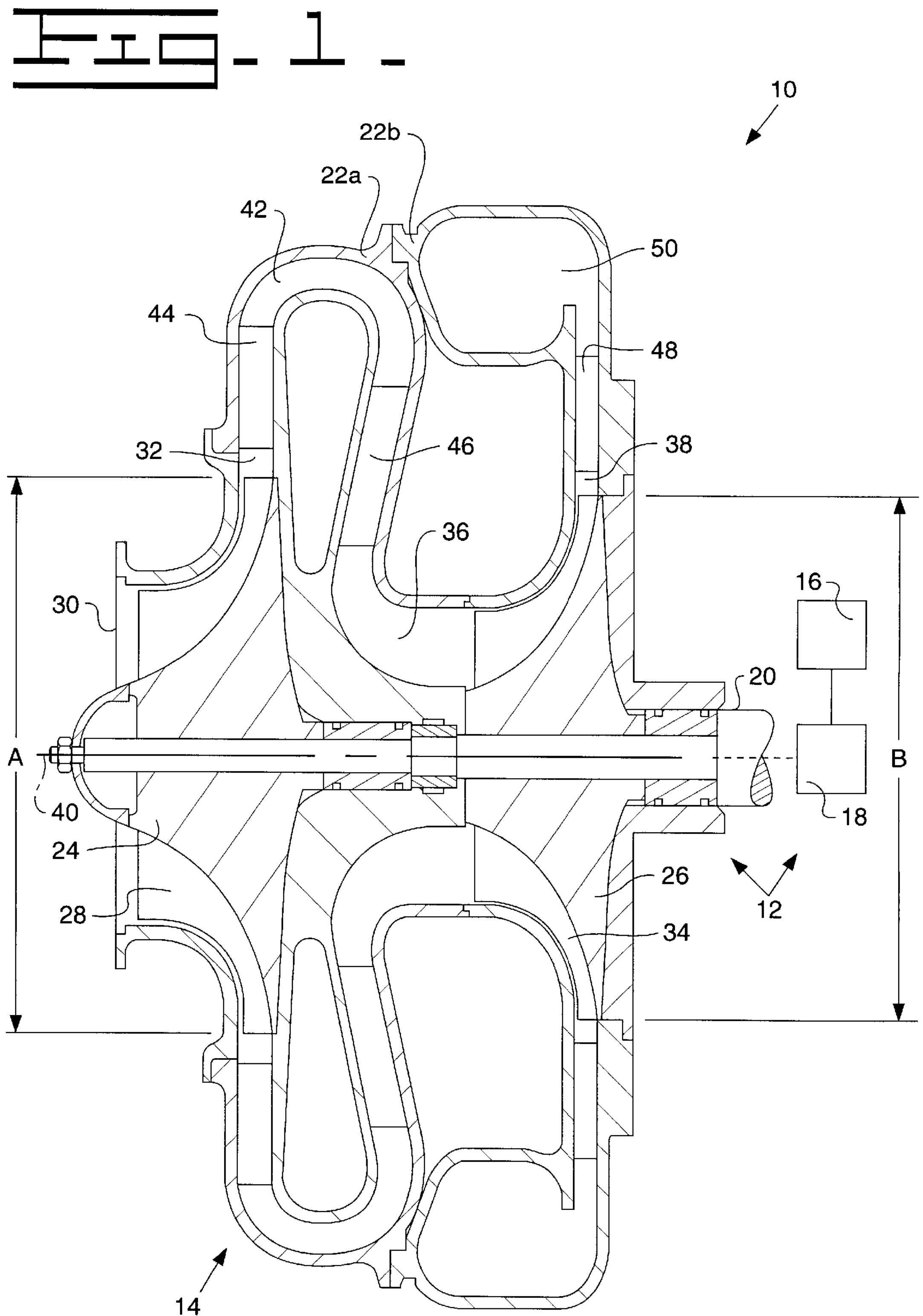
FIG. 1 is a partially schematic, partially sectioned view of an internal combustion engine including an embodiment of a multi-stage compressor of the present invention.

Referring now to the drawings, and more particularly to FIG. 1, there is shown a portion of an internal combustion engine 10 including a turbocharger 12 with an embodiment of a multi-stage compressor 14 of the present invention. Internal combustion engine 10 includes various components, including an exhaust manifold 16, turbocharger 12, and intake manifold (not shown), etc.

Turbocharger 12 includes a turbine 18 and multi-stage compressor 14. Turbine 18 includes a turbine wheel (not shown) which is rotatably driven by exhaust gas from exhaust manifold 16. The turbine wheel is coupled with and carried by shaft 20.

Multi-stage compressor 14 includes housing parts 22A and 22B, each of which are respectively associated with a first compressor wheel 24 and a second compressor wheel 26 carried by common shaft 20. First compressor wheel 24 includes a plurality of blades 28. An inlet 30 is disposed at the upstream side of first compressor wheel 24 and an outlet 32 is disposed at the down stream side of first compressor wheel 24. Similarly, second compressor wheel 26 includes a plurality of blades 34. A second inlet 36 is disposed at the upstream side of second compressor wheel 26, and a second outlet 38 is disposed at the downstream side of second compressor wheel 26. First inlet 30 and second inlet 36 each extend in an axial direction relative to longitudinal axis 40 of shaft 20; and first outlet 32 and second outlet 38 each extend in a radial direction relative to axis 40.

An interstage duct 42 interconnects first outlet 32 associated with first compressor wheel 24 with second inlet 36 associated with second compressor wheel 26. A plurality of diffuser vanes 44 are positioned at the downstream side of first outlet 32. Diffuser vanes 44 cause the air flow exiting from first outlet 32 to decrease in velocity and increase in static pressure. A plurality of deswirler vanes 46 positioned within interstage duct 42 upstream from second inlet 36 reduce the swirling of the air flowing through interstage duct 42, and direct the air into second inlet 36. A plurality of diffuser vanes 48 are positioned downstream from second outlet 38 associated with second compressor wheel 26. Diffuser vanes 48 function similarly to diffuser vanes 44, and thereby cause a decreased velocity and increased static pressure in the air flow exiting from second outlet 38. A volute 50 on the downstream side of diffuser vanes 48 discharges the compressed air to an intake manifold (not shown) of internal combustion engine 10.

Figure 2:
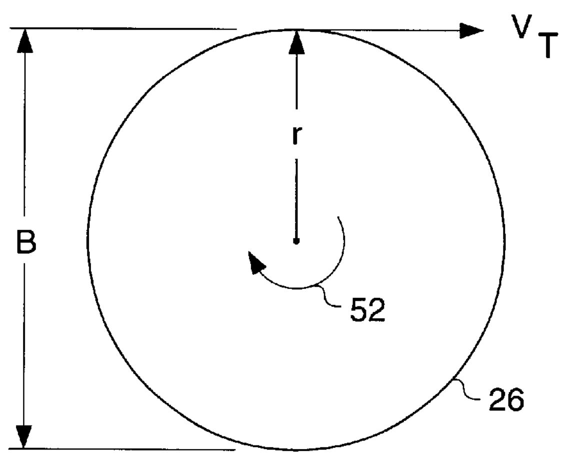
FIG. 2 is a simplified schematic illustration of the second compressor wheel shown in FIG. 1.

A schematic representation of second compressor wheel 26 (FIG. 2) and the stress capacity as a function of temperature of a material from which second compressor wheel 26 is manufactured (FIG. 3) are illustrated. As shown in FIG. 2, the tangential velocity of second compressor wheel 26 occurs at the outermost radial periphery thereof. Second compressor wheel 26 has a radius r, a diameter B, and rotates at a given rotational speed ω, as indicated by rotational arrow 52. Thus, the tangential velocity $V_T$ is represented by the mathematical expression:

$$V_T=\omega*(\pi*B) \qquad \text{(Equation A)}$$

where, $V_T$=tangential velocity (mm/s);

ω=rotational speed (rev/s);

π=pi;

B=diameter (mm); and

π*B =circumference per revolution (mm/rev).

Figure 3:
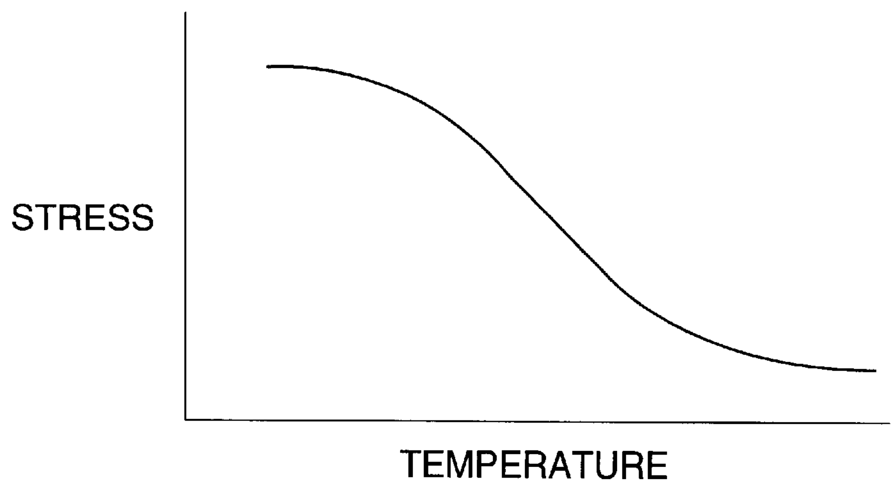
FIG. 3 illustrates the stress capacity at a given temperature for a material from which the second compressor wheel may be constructed.

The tangential velocity $V_T$ causes a stress within the material from which second compressor wheel 26 is constructed. Different materials can of course withstand different stresses. However, the stress level which may be endured by a particular material also is a function of temperature as shown in FIG. 3. The higher the temperature, the lower the stress which may be endured by a particular material. Regardless of the particular material selected, the stress/temperature relationship is generally as shown in FIG. 3. The ambient air which is compressed by first compressor wheel 24 is also heated as a result of the work performed thereon. In addition, second compressor wheel 26 further heats the air as a result of the work performed thereon. The increased temperature results in a decreased stress capacity of the material from which second compressor wheel 26 is constructed. Hence, the stress which must be endured by second compressor wheel 26 generally is a function of the radius R of second compressor wheel 26, the rotational speed ω of second compressor wheel 26 and the temperature of the compressed air flowing past second compressor wheel 26.

Multi-stage compressor 14, in the embodiment shown, provides a total pressure ratio $PR_{Tot}$ of between 3.5:1 and 9:1. It is known that the total pressure ratio $PR_{Tot}$ is a function of the product of a first pressure ratio $PR_{C1}$ provided by first compressor wheel 24 and a second pressure ratio $PR_{C2}$ provided by second compressor wheel 26. That is, each of first compressor wheel 24 and second compressor wheel 26 independently provide a pressure ratio $PR_{C1}$ and $PR_{C2}$ if operated as a single stage compressor. The total pressure ratio $PR_{Tot}$ is thus represented by the mathematical relationship:

$$PR_{Tot}=PR_{C1}*PR_{C2}$$

where, $PR_{Tot}$=total pressure ratio;

$PR_{C1}$=first pressure ratio; and $PR_{C2}$=second pressure ratio.

Mathematically manipulating this formula, it may thus be readily observed that if first compressor wheel 24 has a specific pressure ratio $PR_{C1}$, then second compressor wheel 26 must be sized with a diameter B to provide a total pressure ratio $PR_{Tot}$. The pressure ratio $PR_{C2}$ which must be provided by second compressor wheel 26 to achieve a total pressure ratio $PR_{Tot}$ given a predetermined pressure ratio $PR_{C1}$ of first compressor wheel 24 is thus represented by the mathematical expression:

$$PR_{C2}=PR_{Tot}/PR_{C1}.$$

Although second compressor wheel 26 may be properly sized as described above, a determination must also be made to ensure that the physical properties of the material from which second compressor wheel 26 is constructed are also sufficient to endure the stress which occurs within second compressor wheel 26 during operation. After sizing of second compressor wheel 26 as described above to provide a particular pressure ratio, the tangential velocity $V_T$ may be calculated with the known diameter of second compressor wheel 26 in a manner as described above (Equation A). Alternatively, it is also known that the desired second pressure ratio PRC2 of second compressor wheel 26 is approximately proportional to the tangential velocity $V_T$ raised to the 1.5 power. Tangential velocity $V_T$ may thus be estimated using this relationship. Regardless of the specific method of determining the tangential velocity $V_T$, the stress within second compressor wheel 26 may be calculated with the determined tangential velocity $V_T$. The temperature of the air which flows past second compressor wheel 26 may also be determined either theoretically or empirically. The stress capacity for a particular material may thus be observed using a stress/temperature curve similar to that shown in FIG. 3. If the calculated stress is less than the stress capacity of a selected material at a given operating temperature (i.e., below the stress/temperature line of FIG. 3), then the selected material may be advantageously used for construction of second compressor wheel 26. On the other hand, if the calculated stress exceeds the stress capacity at the given operating temperature, a different material must be selected for construction of second compressor wheel 26.

In the embodiment shown in FIG. 1, first compressor wheel 24 is constructed from aluminum, and second compressor wheel 26 is constructed from titanium or steel. Aluminum has a relatively light density but is not particularly suitable for high temperature use. Since first compressor wheel 24 receives cool ambient air, first compressor wheel 24 may be constructed from lightweight aluminum. The lightweight aluminum is relatively inexpensive and results in a small rotational inertia of first compressor wheel 24.

On the other hand, second compressor wheel 26 must endure relatively high temperatures and thus be constructed from a material which has good stress capacity and other physical properties (e.g., creep) at the relatively high temperature. Because second compressor wheel 26 has a smaller diameter, the rotational inertia is less even though a denser material is utilized. Titanium or steel have sufficient stress capacity at expected operating temperatures, and also have other desirable physical properties such as low creep, etc. at the high operating temperatures. Other materials such as aluminum alloys (e.g., 356, 7075, A206, 2618, 201 and silicon carbide reinforced aluminum) may also be acceptable. In the embodiment shown, first compressor wheel 24 has a first diameter A and second compressor wheel 26 has a diameter B with a ratio (A:B) therebetween of 1.15:1 and 2.5:1.

Industrial Applicability

During use, exhaust gas from exhaust manifold 16 drives turbine 18, which in turn drives common shaft 20 carrying first compressor wheel 24 and second compressor wheel 26. Combustion air enters multi-stage compressor 14 at inlet 30. Blades 28 of first compressor wheel 24 accelerate the air flow to first outlet 32. The accelerated air impinges upon diffuser vanes 44, resulting in a decreased velocity and increased static pressure. Deswirler vanes 46 reduce the swirling action of the air flowing through interstage duct 42 and direct the air into second inlet 36 associated with second compressor wheel 26. An optional interstage cooler (not shown) may be provided for cooling the air which impinges on second compressor wheel 26. Blades 34 of second compressor wheel 26 accelerate the air to second outlet 38 where the high velocity air impinges upon diffuser vanes 48, resulting in an increased static pressure. The compressed air then flows into volute 50. From volute 50, the mixture is transported to an intake manifold (not shown) of internal combustion engine 10.

The present invention provides a multi-stage compressor with a second compressor wheel which is constructed from a material having a stress capacity which is a function of the diameter of second compressor wheel 26, rotational speed of second compressor wheel 26, and temperature of air flowing past second compressor wheel 26. The first compressor wheel has a larger diameter and is constructed from a lightweight material such as aluminum which is low cost and has a small rotational inertia. The second compressor wheel is constructed from a denser material and has a smaller diameter. The smaller diameter results in a reduced stress as well as rotational inertia. Multi-stage compressor 14 is thus provided with first and second compressor wheels having optimized sizing and material selection.

Other aspects, objects and advantages of this invention can be obtained from a study of the drawings, the disclosure and the appended claims.

What is claimed is:

1. A method of configuring a compressor in a turbocharger for use in an internal combustion engine, comprising the steps of:

providing a multi-stage compressor including a first compressor wheel carried by a shaft, a first inlet associated with said first compressor wheel, a radially extending first outlet associated with said first compressor wheel, a second compressor wheel carried by said shaft, a second inlet associated with said second compressor wheel, and a radially extending second outlet associated with said second compressor wheel, said first compressor wheel being made of a first material, said second compressor wheel being made of a second material;

fluidly interconnecting in series said first outlet associated with said first compressor wheel with said second inlet associated with said second compressor wheel using an interstage duct;

selecting a total pressure ratio to be provided by said multi-stage compressor;

ascertaining a first pressure ratio provided by said first compressor wheel at an operating speed;

sizing said second compressor wheel to provide a second pressure ratio, dependent upon said total pressure ratio and said first pressure ratio;

determining a stress on said second compressor wheel at said operating speed;

determining a temperature within said interstage duct at said operating speed, and selecting said second material from which said second compressor wheel is made, dependent upon each of said stress determining step and said temperature determining step, said second material being denser than and capable of operating at higher temperatures than said first material.

2. The method of claim 1, wherein said step of selecting said total pressure ratio includes selecting a total pressure ratio of between 3.5:1 and 9:1.

3. The method of claim 1, wherein said first compressor wheel has a first diameter (A), and said first compressor wheel and said second compressor wheel have a ratio (A:B) of between 1.15:1 and 2.5:1.

4. The method of claim 1, wherein said selecting step includes selecting said second material from which said second compressor is made from one of titanium, steel and aluminum alloy.

5. The method of claim 4, including the step of selecting said first material from which said first compressor wheel is made, dependent upon said first pressure ratio.

6. The method of claim 5, wherein said first compressor wheel is comprised of aluminum.

7. A method of configuring a compressor in a turbocharger for use in an internal combustion engine, comprising the steps of:

providing a multi-stage compressor including a first compressor wheel carried by a shaft, a first inlet associated with said first compressor wheel, a radially extending first outlet associated with said first compressor wheel, a second compressor wheel carried by said shaft, a second inlet associated with said second compressor wheel, and a radially extending second outlet associated with said second compressor wheel;

fluidly interconnecting in series said first outlet associated with said first compressor wheel with said second inlet associated with said second compressor wheel using an interstage duct;

selecting a total pressure ratio to be provided by said multi-stage compressor;

ascertaining a first pressure ratio provided by said first compressor wheel at an operating speed;

sizing said second compressor wheel to provide a second pressure ratio, dependent upon said total pressure ratio and said first pressure ratio, said step of sizing said second compressor wheel being carried out using the mathematical relationship:

$$PR_{Tot}=PR_{C1}*PR_{C2}$$

where, $PR_{Tot}$=total pressure ratio;

$PR_{C1}$=first pressure ratio; and $PR_{C2}$=second pressure ratio, determining a stress on said second compressor wheel at said operating speed;

determining a temperature within said interstage duct at said operating speed; and selecting a material from which said second compressor wheel is comprised, dependent upon each of said stress determining step and said temperature determining step.

8. The method of claim 7, wherein said step of sizing said second compressor wheel includes the sub-steps of:

calculating said second pressure ratio using the mathematical expression:

$$PR_{C2}=PR_{Tot}/PR_{C1};$$

and establishing a diameter of said second compressor wheel using said calculated second pressure ratio.

9. A method of configuring a compressor in a turbocharger for use in an internal combustion engine, comprising the steps of:

providing a multi-stage compressor including a first compressor wheel carried by a shaft, a first inlet associated with said first compressor wheel, a radially extending first outlet associated with said first compressor wheel, a second compressor wheel carried by said shaft, a second inlet associated with said second compressor wheel, and a radially extending second outlet associated with said second compressor wheel;

fluidly interconnecting in series said first outlet associated with said first compressor wheel with said second inlet associated with said second compressor wheel using an interstage duct;

selecting a total pressure ratio to be provided by said multi-stage compressor;

ascertaining a first pressure ratio provided by said first compressor wheel at an operating speed;

sizing said second compressor wheel to provide a second pressure ratio, dependent upon said total pressure ratio and said first pressure ratio;

determining a stress on said second compressor wheel at said operating speed, said stress determining step including the sub-step of calculating a tangential velocity (VT) of said second compressor wheel;

determining a temperature within said interstage duct at said operating speed; and selecting a material from which said second compressor wheel is comprised, dependent upon each of said stress determining step and said temperature determining step.

10. The method of claim 9, wherein said second compressor wheel has a second diameter (B), and wherein said sub-step of calculating said tangential velocity ($V_T$) is carried out using the mathematical expression:

$$V_T=\omega*(\pi*B)$$

where, $V_T$=tangential velocity (mm/s);

$\omega$=rotational speed (rev/s);

$\pi$=pi;

B=diameter (mm); and $\pi$*B=circumference per revolution (mm/rev).

11. The method of claim 9, wherein said calculating sub-step includes using a mathematical relationship between said second pressure ratio and said tangential velocity ($V_T$).

12. The method of claim 11, wherein said second pressure ratio is proportional to said tangential velocity and is represented by the mathematical expression:

$$PR_{C2}\sim(V_T)^{1.5}.$$

13. A method of operating an internal combustion engine, comprising the steps of:

providing an exhaust manifold;

providing a multi-stage compressor including a turbine carried by a shaft, a turbine inlet fluidly connected with said exhaust manifold, a first compressor wheel carried by said shaft, a first inlet associated with said first compressor wheel, a radially extending first outlet associated with said first compressor wheel, a second compressor wheel carried by said shaft, a second inlet associated with said second compressor wheel, and a radially extending second outlet associated with said second compressor wheel;

fluidly interconnecting in series said first outlet associated with said first compressor wheel with said second inlet associated with said second compressor wheel using an interstage duct;

selecting a total pressure ratio to be provided by said multi-stage compressor;

ascertaining a first pressure ratio provided by said first compressor wheel at an operating speed;

sizing said second compressor wheel to provide a second pressure ratio, dependent upon said total pressure ratio and said first pressure ratio;

determining a stress on said second compressor wheel at said operating speed;

determining a temperature within said interstage duct at said operating speed;

selecting a first material from which said first compressor wheel is made and a second material from which said second compressor wheel is made, dependent upon each of said stress determining step and said temperature determining step, said second material being denser than and capable of operating at a higher temperature than said first material; and rotatably driving said turbine, said first compressor wheel and said second compressor wheel using exhaust gas from said exhaust manifold.

14. A turbocharger for an internal combustion engine, comprising:

a multi-stage compressor providing a total pressure ratio of between 3.5:1 and 9:1, said multi-stage compressor including:

a shaft;

a first compressor stage including a first compressor wheel carried by said shaft, an axially extending first inlet associated with said first compressor wheel, and a radially extending first outlet associated with said first compressor wheel, said first compressor wheel having a first diameter (A) and being made of a first material, said first material being aluminum;

a second compressor stage including a second compressor wheel carried by said shaft, an axially extending second inlet associated with said second compressor wheel, and a radially extending second outlet associated with said second compressor wheel, said second compressor wheel having a second diameter (B) and being made of a second material, said second material being chosen from one of titanium, steel and aluminum alloy, said second material being denser than and capable of operating at higher temperatures than said first material, said first compressor wheel and said second compressor wheel have a ratio (A:B) of between 1.15:1 and 2.5:1.; and an interstage duct fluidly interconnecting in series said first outlet associated with said first compressor wheel with said second inlet associated with said second compressor wheel.

15. An internal combustion engine, including:

an intake manifold; and a turbocharger including a multi-stage compressor providing a total pressure ratio of between 3.5:1 and 9:1, said multi-stage compressor including:

a shaft;

a first compressor stage including a first compressor wheel carried by said shaft, an axially extending first inlet associated with said first compressor wheel, and a radially extending first outlet associated with said first compressor wheel, said first compressor wheel having a first diameter (A) and being made of a first material, said first material being aluminum;

a second compressor stage including a second compressor wheel carried by said shaft, an axially extending second inlet associated with said second compressor wheel, and a radially extending second outlet associated with said second compressor wheel, said second compressor wheel having a second diameter (B) and being made of a second material, said second material being chosen from one of titanium, steel and aluminum alloy, said second material being denser than and capable of operating at higher temperatures than said first material, said first compressor wheel and said second compressor wheel have a ratio (A:B) of between 1.15:1 and 2.5:1; and an interstage duct fluidly interconnecting in series said first outlet associated with said first compressor wheel with said second inlet associated with said second compressor wheel.

* * * * *